(No Model.)
BEST AVAILABLE COP·
E. THOMSON.
ELECTRIC PIPE JOINING AND PIPE WORK.
No. 396,013. Patented Jan. 8, 1889.
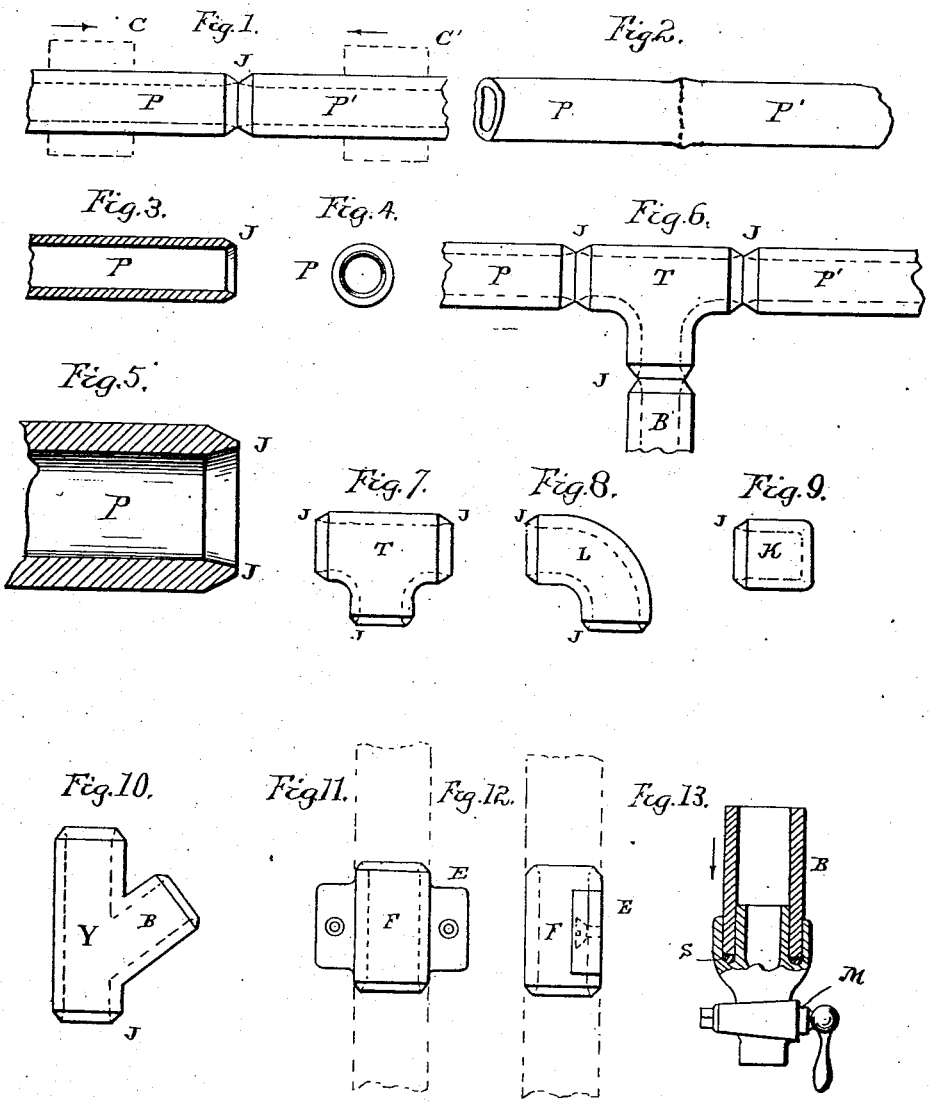
Witnesses.
Ira R. Steward,
Wm. W. Capel
Inventor.
Elihu Thomson.
By his Attorneys
Townsend & MacArthur

UNITED STATES PATENT OFFICE.

ELIHU THOMSON, OF LYNN, MASSACHUSETTS.

ELECTRIC PIPE-JOINING AND PIPE-WORK.

SPECIFICATION forming part of Letters Patent No. 396,013, dated January 8, 1889.

Application filed August 16, 1888. Serial No. 282,889. (No model.)

*To all whom it may concern:*

Be it known that I, ELIHU THOMSON, a citizen of the United States, and a resident of Lynn, in the county of Essex and State of Massachusetts, have invented a certain new and useful Electric Pipe-Joining and Pipe-Work, of which the following is a specification.

The present invention consists of certain improvements which I have made in adapting my process of electric welding, particularly to lead pipe and other soft-metal pipes. I find that the best joints between pieces of such pipe are made under specific conditions, and that by modifying the methods somewhat I am able to join lead pipe without solder without increasing the diameter of the pipe, and with a minimum of labor as compared with the existing methods of making wiped joints. I also introduce new articles of special form into such work, as T's, elbows, branches, &c., made separately and joined into the pipe-course wherever needed.

My invention consists, essentially, in forming the tube or pipe, or section of tube or pipe that is to be joined to another section, with a taper or chamfer at the portion to be abutted, as will be hereinafter described.

My invention consists, also, in forming the taper or chamfer both from the inside outward, and preferably, but by no means necessarily, in such manner that the resultant edge or ridge shall be somewhat nearer to the interior than to the exterior diameter of the pipe.
In the accompanying drawings, Figure 1 illustrates two sections as formed in accordance with my invention preliminarily to the welding operation. Fig. 2 shows the same sections as they appear after the welding operation. Fig. 3 shows a pipe in section with its end prepared or shaped in a preferred manner preparatory to the welding operation. Fig. 4 is an end view of said pipe. Fig. 5 illustrates a further slight modification in the shape given to the end of the pipe. Fig. 6 shows how a T prepared in accordance with my invention may be inserted between sections of pipe. Fig. 7 shows the T separate. Figs. 8, 9, and 10 illustrate other forms of tube or pipe prepared in accordance with my invention, Fig. 8 being an elbow, Fig. 9 a cap, and Fig. 10 a Y-branch. Figs. 11 and 12 show in side and edge view a fastening-section of pipe prepared in similar manner. Fig. 13 illustrates a prepared cock to be joined electrically to the end of a pipe, or to a T or the like in plumbing.

In Fig. 1, P P' are the pieces of pipe to be joined by clamping them in abutment and passing a heating electric current through the joint. Dotted lines indicate clamps C C', of any construction, relatively movable as in my general electric-welding process. On the end of each piece of pipe is made a taper or bevel, which includes nearly the whole of the end, leaving only a narrow line or ridge in abutment under comparatively small pressure. On passing current the small ridges in contact melt first, and as the pieces move together the tapered portion continues to melt and solder, as it were, the ends of the pipes together with the material of the pipe itself, giving a result like that shown in Fig. 2—a strong and good joint not much enlarged.

The tapering of the ends is quite important for the best results, and to obtain the best results the tapering should be such as to leave only a narrow ridge of each piece meeting at the start. This applies to lead and tin pipe chiefly, which do not become weldable properly unless melted at the meeting-points. The clamps C C' must follow up the melting as fast as it occurs and keep the solid metal in abutment.

In order to keep the interior of the pipe open and clear, the ends are best prepared as shown in Figs. 3, 4, and 5. Fig. 3 shows a double taper both from the bore out and from the outside, meeting in a ridge rather nearer the interior surface of the pipe than its exterior. As shown in Fig. 5 enlarged, a small circular portion of the end may be left flat at J J, while the rest is chamfered, as shown. I find this mode of preparation of great value with lead in obtaining good-looking joints and without choking the pipe-bore. The same method is followed in preparing the parts of a T-piece to be set into the pipe by electric welding, as in Fig. 6, T being a lead casting, (for lead-work,) and the lead pipes P, P', and

B being joined thereto, as in Fig. 1. I make the T-pieces separately by casting, and preferably with the ends for joining tapered for use. They may also be forced into shape in dies, as usual with soft metals. Elbow-pieces, Fig. 8, are likewise made with tapers, for use where it is not desired to turn a corner by bending the pipe. So, also, caps of the same metal as the pipes may be provided for covering or closing a dead end. In Fig. 9 such a cap ready to be welded to a pipe is shown, the end J being prepared by tapering, as shown in Fig. 5.

Fig. 10 shows a modified T or branch piece, Y, differing only from piece T, Fig. 7, in the direction of the branch-connection as regards the pipe itself. In Figs. 11 and 12 the piece F, ready to be inserted between the pipe-pieces, has ears E E integral with it for a fastening to a support by nails or screws. It is needless to say that such piece might also be a T-branch, or that the T-piece, Fig. 7, or elbow, Fig. 8, or cap, Fig. 9, or Y, Fig. 10, might each have one or more such ears for fastening.

Stop-cocks may be prepared for use in joining to T-branches, to pipes, or the like by the insertion, as in Fig. 13, of a lead-pipe end into a deep groove formed in the cock M, of brass or other metal, in which groove a small ring of soft solder, S, has been placed and a suitable flux applied. On heating the cock M to melt the solder, the piece of lead B being at the same time forced into the groove in M, the solder will perfect the joint between them, and the piece may then be used to join, as in Fig. 1, to other lead pipes or pieces. The piece B, Fig. 13, it will be seen, could have been a T-piece itself, or an elbow, L, to one end or opening in which the cock M was affixed, as described.

I do not limit myself to lead and tin pipe merely, but apply the same general principle to other pipe-welding, particularly the production as separate manufactures of T's, Y's, elbows, caps, fastening-pieces, &c., of such shape as to be readily welded, instead of screwed, to the other parts. I am thus enabled to secure non-leaking joints without cement, to make the joints far more rapidly than screw-joints can be cut and put together, and to preserve the outside diameter as well as the inside diameter of the pipe.

What I claim as my invention is—

1. The herein-described improvement in forming electrically-welded joints between pipes, tubes, or tubular pieces, consisting in forming the taper or chamfer upon the end of the tube or tubular portion, abutting the end of the tube against the tube or pipe to which it is to be joined, and subjecting the two pieces or sections of pipe to an endwise pressure while they are in a heated state, as and for the purpose described.

2. The herein-described improvement in electrically welding pipes, tubes, or tubular pieces or objects, consisting in forming a double taper or chamfer both from the bore out and from the outside inward, as and for the purpose described.

3. The herein-described improvement in electrically welding pipes, tubes, or tubular pieces, consisting in chamfering or tapering the tubular end so as to leave a narrow ridge or edge rather nearer the inside than the outside diameter of the tube, as and for the purpose described.

4. The herein-described improvement in electrically welding lead, tin, or other soft pipes, tubes, or tubular pieces, consisting in forming the abutting end of the tube with a narrowed edge preliminarily to the welding operation, as and for the purpose described.

5. The herein-described improvement in welding together two tubular sections or pieces of lead, tin, or other soft metal, consisting in forming the abutting ends of the tubes or tubular portions with a narrow edge or ridge, passing a heating electric current across the joint, and moving the pieces together to follow the melting of the tapered portion.

Signed at Lynn, in the county of Essex and State of Massachusetts, this 13th day of August, A. D. 1888.

ELIHU THOMSON.

Witnesses:
J. W. GIBBONEY,
A. L. ROHRER.